United States Patent [19]

Karcher, Jr.

[11] Patent Number: 4,612,538

[45] Date of Patent: Sep. 16, 1986

[54] NAIL DETECTOR SYSTEM

[75] Inventor: Ralph E. Karcher, Jr., Magnolia, Mass.

[73] Assignee: Emhart Corporation, Hartford, Conn.

[21] Appl. No.: 542,012

[22] Filed: Oct. 14, 1983

[51] Int. Cl.4 ............................................. G08B 21/00
[52] U.S. Cl. ..................................... 340/679; 340/674; 221/8; 12/42 B
[58] Field of Search .................... 227/1, 114; 340/674, 340/679, 684; 221/2, 8; 12/8.6, 10.2, 10.6, 11.2, 12.1, 13.1, 42 B; 198/502

[56] References Cited

U.S. PATENT DOCUMENTS

| | | |
|---|---|---|
| 1,910,681 | 5/1933 | Dickson ........................ 340/679 X |
| 2,734,191 | 2/1956 | Quarmby ............................ 221/2 |
| 3,279,671 | 10/1966 | Bachman, Jr. et al. ............... 227/1 |
| 3,723,989 | 3/1973 | Fathauer et al. .................... 340/674 |
| 4,268,825 | 5/1981 | Kaplan ............................ 340/674 X |
| 4,333,096 | 6/1982 | Jenkins et al. .................... 340/684 |
| 4,344,520 | 8/1982 | Czoch et al. .................... 198/502 X |
| 4,491,997 | 1/1985 | Price .................................. 12/12.1 |

Primary Examiner—James L. Rowland
Assistant Examiner—Brian R. Tumm
Attorney, Agent, or Firm—William F. White

[57] ABSTRACT

A system is disclosed for detecting the proper transfer of nails within a nailing machine. The disclosed system includes optical sensors attached to feed tubes within the nailing machine. Signals produced by the optical sensors are processed in such a manner as to alert the operator of the machine at a predetermined time when an improper transfer of nails has occurred.

17 Claims, 5 Drawing Figures 4,612,538

NAIL DETECTOR SYSTEM

FIELD OF THE INVENTION

This invention relates to the processing of nails within a machine which automatically nails certain things together. In particular, this invention relates to a sensing of the nails being processed so as to determine whether the machine is operating properly.

BACKGROUND OF THE INVENTION

The processing of nails within high speed nailing machinery has at times proved troublesome. The flow of nails within such machinery has sometimes been disrupted by various mechanical interferences within the machine itself. On the other hand, the nails themselves have sometimes proved troublesome because of their inherent size variations and other imperfections which tend to defeat completely reliable automatic processing.

The above problems have been particularly noted within machines which attach heels to the bottoms of shoes in the shoe making process. In these machines, nails are typically fed from a hopper to an area wherein the nails are arranged in a predefined pattern for attachment of a heel to the shoe bottom. The thus arranged nails are subsequently driven into both the bottom of the shoe as well as the heel which has been positioned thereover. It has been noted that nails are sometimes missing from the shoe parts that have been thus nailed together. This either requires a manual correction or a complete discarding of the assembled shoe parts.

OBJECTS OF THE INVENTION

It is an object of the invention to provide a system for detecting an improper transfer of nails within a nailing machine;

It is another object of the invention to provide a system for use with a nailing machine which alerts the operator of the machine when a predetermined pattern of nails has not been properly transferred; and It is still another object of the invention to provide a system which identifies where a nail is missing from a pattern of nails that is to be automatically driven by a nailing machine.

SUMMARY OF THE INVENTION

The above and other objects are achieved according to the present invention by a system which monitors the passage of nails from a hopper or feeding station through a series of feed tubes to a nail loader. The nail loader receives the nails in a predefined pattern for use in nailing a heel to the bottom of a shoe. The pattern of nails is transferred by the nail loader to a nailing station which is to subsequently receive shoe parts that are to be nailed together.

The passage of a nail within a given feed tube is optically sensed by a nail sensor mounted on each tube. Each nail sensor produces an electrical pulse signal when a nail has passed through the tube. The signals from each nail sensor are applied to circuitry which compensates for any drift in these signals. Further circuitry processes the signals in such a manner as to maintain an accurate accounting of whether or not a pulse has actually been timely produced by a sensor. In the event that a pulse has not been timely produced, the circuitry will alert the operator of the machine that one or more nails are missing. The operator is alerted when the nail loader has received nails from the various feed tubes and is moving to the nailing station. The alert preferably includes both a buzzer and a flashing light which catches the attention of the operator. The operator may also view a panel of lights arranged in accordance with the pattern of nails being transferred from the nail loader to the nailing station. A given light on this panel will not be illuminated if a nail is missing from a corresponding location within the transferred pattern of nails. This allows the operator of the machine to easily identify where a nail needs to be manually inserted at the nailing station. This is accomplished prior to the shoe parts being positioned over the nailing station for the subsequent nailing operation.

DESCRIPTION OF THE DRAWINGS

The above and other features of the invention will now be particularly described with reference to the accompanying drawings, in which.

DESCRIPTION OF THE PREFERRED EMBODIMENT

Figure 1:
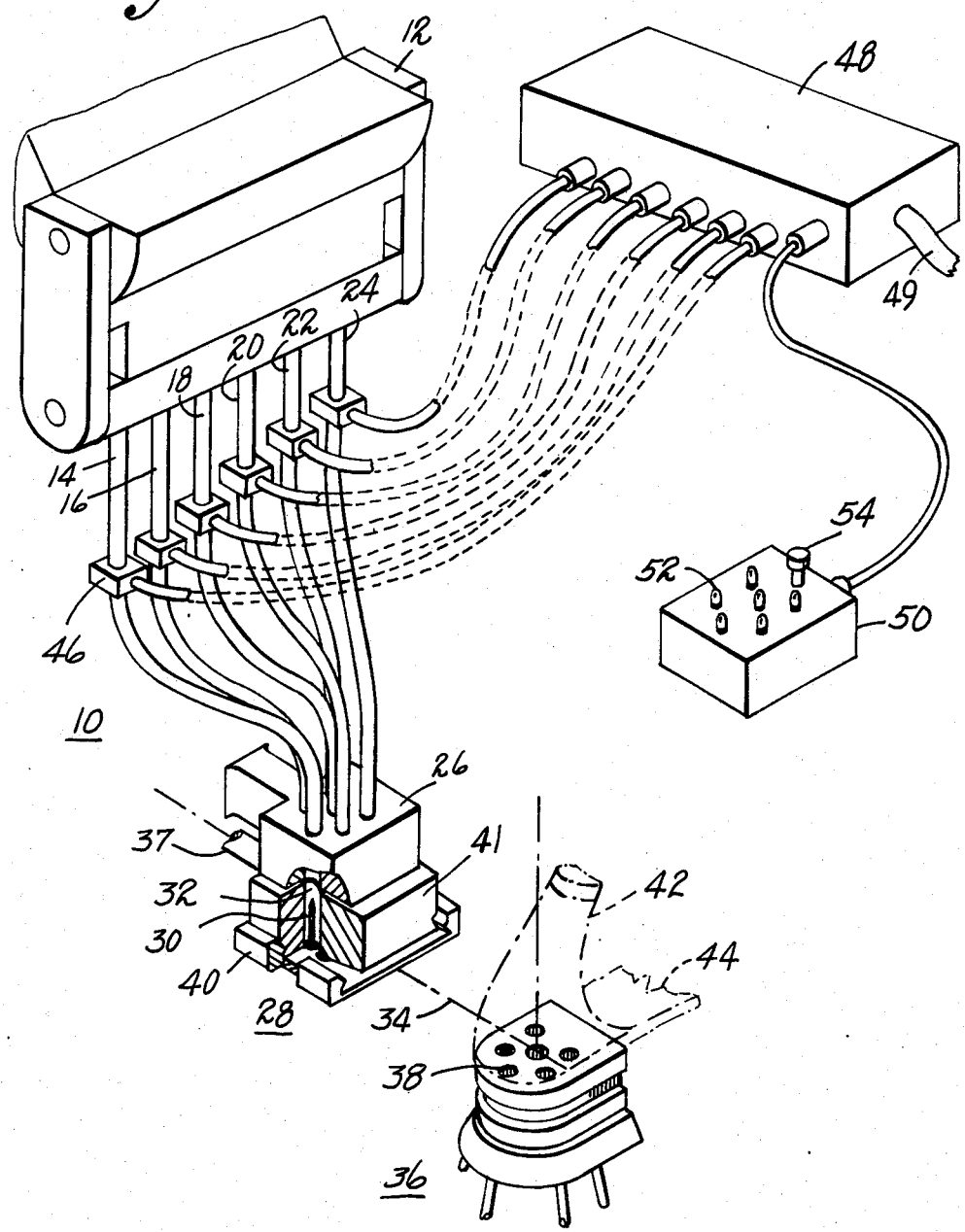
FIG. 1 illustrates the nail detection system in association with certain portions of a nailing machine.

Referring to FIG. 1, a nail feeding system 10 is generally illustrated. The nail feeding system includes a nail separating station 12 which upon command drops one nail into each of a plurality of translucent plastic feed tubes labeled 14 through 24 in FIG. 1. The feed tubes 14 through 24 are preferably translucent so as to allow detection of a nail passing therethrough in a manner which will be described hereinafter. Each feed tube delivers a nail to a respective position within a receiving block 26 which preferably defines the nailing pattern for the thus received nails. The receiving block 26 thereafter drops the arranged pattern of nails into a nail loader 28. A thus received nail 30 from the feed tube 14 is illustrated within a channel 32 in the nail loader 28. The nail loader 28 is movable along an axis 34 so as to deliver the nails to a nailing station 36. The nail loader 28 is preferably moved by a pneumatic actuator (not shown) which experiences a build-up of pneumatic pressure following the receipt of nails from the receiving block 26. A drive member 37 associated with the pneumatic actuator moves the nail loader 28 from the illustrated position underneath the receiving block 26 to a position directly over the nailing station 36. The nailing station 36 includes a plurality of nail receiving holes such as 38 arranged in accordance with the pattern of nails within the nail loader. The nails are dropped from the nail loader 28 into the receiving holes of the nailing station in a manner which will now be described. The nail loader 28 includes a bottom member 40 which is slidable relative to the upper portion 41 of the nail loader. As the nail loader moves over the nailing station, a pin (not shown) extending downwardly from the bottom member 40 will make contact with the nailing station 36. The bottom member 40 will cease to move when this occurs. At this time, holes within the bottom member 40 will be in alignment with the receiving holes 38 in the nailing station. The upper portion 41 of the nail loader continues to move a finite distance relative to the bottom member 40 so as to bring the channels 32 into alignment with the holes in the bottom member 40. This will allow the nails within the channels 32 to drop through the holes in the bottom member and hence into the holes 38 of the nailing station. It is to be understood that the final position of the upper portion 41 of the nail loader is dictated by the full extension of the pneumatic actuator associated with the drive member 37. The pneumatic pressure associated with this full extension of the pneumatic actuator is exhausted when the nails have been transferred to the nailing station 36. The nail loader 28 is next retracted to its illustrated position underneath the receiving block 26. It is to be understood that an appropriate movement of the bottom member 40 occurs relative to the upper portion 41 of the nail loader during this retraction so as to allow nails to be again deposited into the channels 32 of the nail loader.

It is to be appreciated that the above nail transfer system is currently embodied in commercially available nailing machines. In particular, a commercial machine for nailing a heel 42 to the bottom of a shoe 44 has utilized precisely such a nail transfer system. This machine is identified as an "Inside Heel Attaching Machine Model A" available from the USM Machinery Division of Emhart Corporation located in Beverly, Mass.

Referring to FIG. 1, it is seen that the heel 42 and the shoe bottom 44 are illustrated in position over the nailing station 36. This positioning occurs after the nail loader 28 has deposited a pattern of nails and has been retracted along the axis 34. When the shoe pieces are thus positioned, pneumatic nail drivers within the nailing station 36 drive the nails into both the shoe bottom 44 and the heel 42.

Referring again to the feed tubes 14 through 24, it is seen that a nail sensor such as 46 is associated with each feed tube. Each nail sensor provides an electrical pulse signal to a nail pattern sensing system 48 indicating when a nail has passed through its respective tube. The nail pattern sensing system processes the electrical pulse signals in such a manner as to alert the operator of the machine when one or more nails are missing from a given pattern of nails that has been transferred to the nail loader 28. The actual alerting of the operator is preferably accomplished by a flashing light and buzzer (not shown in FIG. 1) which are appropriately placed on the nailing machine. This is done in a timely manner which will be described in detail hereinafter. At this point, it is merely to be noted that the nail pattern sensing system 48 does not alert the operator of the machine as to a missing nail until such time as the nail loader 28 begins to move toward the nailing station 36. This time event is preferably detected by sensing the status of the pneumatic pressure in the pneumatic actuator which moves the nail loader 28 toward the nailing station. This is accomplished by providing a pressure sensitive switch in the pneumatic line associated with the pneumatic actuator. Provision of such a pressure switch within a pneumatic line is well known in the art and need not be discussed in detail herein. The status of this switch is provided to the pattern sensing system 48 via an electrical cable 49.

The information as to which nail is missing in the pattern is also communicated to the operator via a display panel 50. The display panel 50 is preferably a pattern of colored lights such as 52 arranged in the same configuration as the nailing pattern at the nailing station. The light configuration is preferably oriented in precisely the same manner as the pattern of holes 38 at the nailing station. In accordance with the invention, a display light occupying the same location as a given hole in the nailing station will not be illuminated if a nail has not been transferred to that hole by the nail loader. This display of a missing nail at a given location occurs simultaneously with the flashing light and buzzer. This allows the operator to manually place a nail into one or more holes in the nailing station which will not have received a nail from the nail loader 28. This can of course be accomplished before placing the shoe parts on the nailing station. The operator can thereafter reset the pattern of lights on the display panel 50, if he or she chooses to do so, before actuating the nail drivers which drive the nails into the positioned shoe parts.

Figure 2:
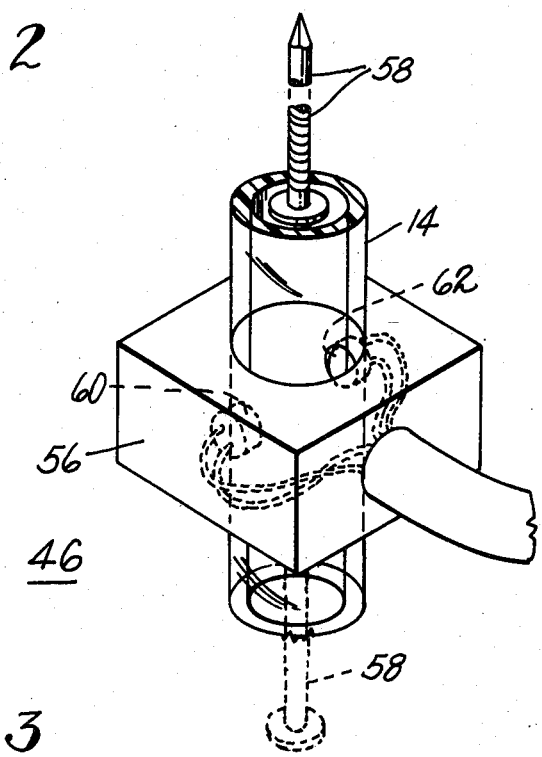
FIG. 2 illustrates a nail sensor associated with a particular feed tube.

Referring now to FIG. 2, the nail sensor 46 is illustrated in further detail. In particular, the nail sensor 46 is seen to comprise a square plastic block 56 having a circular hole therein which receives the translucent plastic feed tube 14. A nail 58 is illustrated both entering and leaving the nail sensor 46. The passage of the nail 58 through the nail sensor 46 is sensed by the interruption of light from a light emitting diode 60 positioned opposite a photosensitive transistor 62. The light emitting diode 60 and transistor 62 are diametrically opposite each other so as to define a beam of light passing through the center of the circular hole of the nail sensor. The radius of the circular hole is at least ten percent smaller than the smallest diameter nail head which passes through the feed tube. This assures that the beam of light from the light emitting diode 60 passing through the center of the circular hole will be interrupted.

Figure 3:
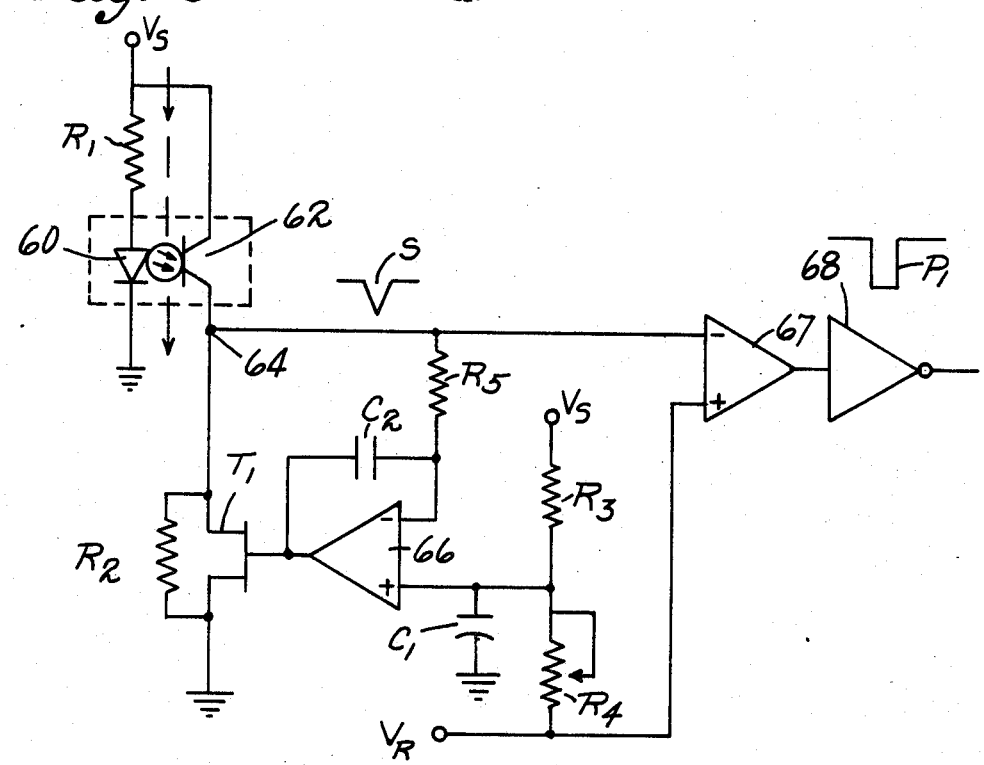
FIG. 3 illustrates the circuitry for each individual nail sensor.

Referring now to FIG. 3, the circuit configuration for the light emitting diode 60 and the photosensitive transistor 62 is illustrated. In particular, a positive voltage source $V_s$ defines the voltage upstream of both circuit elements. The voltage $V_s$ is preferably twelve volts. A resistor $R_1$ defines the current path through the light emitting diode 60 to ground. In a similar manner, a field effect transistor $T_1$ in parallel with a resistance $R_2$ defines the normal current path through the photosensitive transistor 62 to ground.

A normal quiescent voltage condition at a point 64 downstream of the photosensitive transistor 62 is defined by circuitry which will now be described. A differential operational amplifier 66 receives a predefined voltage at its non-inverting input. The predefined voltage is defined by a voltage dividing circuit comprising a resistance $R_3$ in combination with a variable resistance $R_4$ situated between the voltage supply $V_s$ and a reference voltage $V_R$. The reference voltage $V_R$ is preferably a plus four volts and the variable resistor $R_4$ is set so as to define a voltage of 4.1 volts at the non-inverting input of the operational amplifier 66. This differential setting of the operational amplifier need not be further adjusted after the initial setting because of the feed back nature of the circuitry associated with the amplifier 66. This feedback will be discussed hereinafter. A capacitor $C_1$ filters any noise in the voltage dividing circuit so as to assure a steady state voltage of 4.1 volts at all times. The output of the operational amplifier 66 is connected to the field effect transistor $T_1$ as shown. The field effect transistor $T_1$ has a relatively high gain so as to become increasingly conductive as a result of any decrease in the output voltage from the operational amplifier 66. The field effect transistor furthermore decreases in conductivity when the output voltage of the operational amplifier 66 increases. This change in conductivity of the field effect transistor $T_1$, immediately affects the voltage at the quiescent point 64 which in turn is applied to the inverting input of the operational amplifier. In this regard the high gain characteristic of the field effect transistor $T_1$ results in negligible current flowing through a resistance $R_5$ between the quiescent point 64 and the inverting input. A capacitor $C_2$ connected between the output of the operational amplifier 66 and the inverting input combines with the resistance $R_5$ to define a time constant for the responsiveness of the operational amplifier configuration to any change in the quiescent voltage condition at the point 64. In particular, the time constant is defined in such a manner so as to not allow the operational amplifier configuration to respond to any quick change in the voltage condition occurring at point 64. In other words, an electrical pulse produced by a nail interrupting the beam of light being sensed by the photosensitive transistor 62 would not produce a response at the output of the operational amplifier 66 which would affect the field effect transistor $T_1$. On the other hand, any slow change in the voltage at point 64 would be responded to by the operational amplifier configuration. For instance, if the translucent nature of the tube 14 changes so as to result in less light being sensed by the phototransistor 62, then the resistance of the phototransistor would increase thereby tending to slowly lower the quiescent voltage at the point 64. This lowered voltage would produce a lower voltage at the inverting input of the operational amplifier 66. This lowering of the voltage at the non-inverting input would result in an increase in the output voltage of the operational amplifier. This would cause a decrease in the conductivity of the field effect transistor $T_1$ thereby raising the effective resistance of the field effect transistor $T_1$. This would raise the resistance of the field effect transistor $T_1$ in parallel with the resistance $R_2$ so as to thereby maintain the same ratio between the resistance downstream of the point 64 with respect to the resistance of the phototransistor 62 upstream of the point 64. In other words, any slow change in the quiescent voltage at the point 64 would cause the operational amplifier 66 to drive the field effect transistor $T_1$ in the appropriate direction so as to compensate for the change in conductivity of the photosensitive transistor 62. In this manner, the quiescent voltage at the point 64 is effectively maintained at the appropriate voltage level defined by the aforementioned ratio of resistances upstream and downstream of the point 64. It is noted that the particular design of the aforementioned circuitry can incorporate any number of specific circuit elements having appropriate values that produce the desired result. The values of the circuit elements particularly used in the preferred embodiment are as follows:

$R_1$—470 ohms
$R_2$—2.2 mega-ohms
$R_3$—470 kilo-ohms
$R_4$—20 kilo-ohms
$R_5$—390 kilo-ohms
$C_1$—10 micro-farads
$C_2$—4.7 micro-farads Referring again to the voltage condition at point 64, it is noted that this condition is applied to the inverting input of a comparator amplifier 67. This amplifier also receives the reference voltage $V_R$ (preferably four volts) at its non-inverting input. The slight differential at the inputs of the comparator amplifier 67 allow it to respond to a negative voltage spike S, produced by the photosensitive transistor 62 when a nail passes through the feed tube 14 interrupting the beam of light from the light emitting diode 60. The response of the comparator amplifier 67 is a positive pulse at its output. This positive pulse is inverted by an amplifier 68 so as to produce a negative pulse $P_1$. It is to be understood that a similar negative pulse will be produced by circuitry associated with each nail sensor in FIG. 1.

Figure 4:
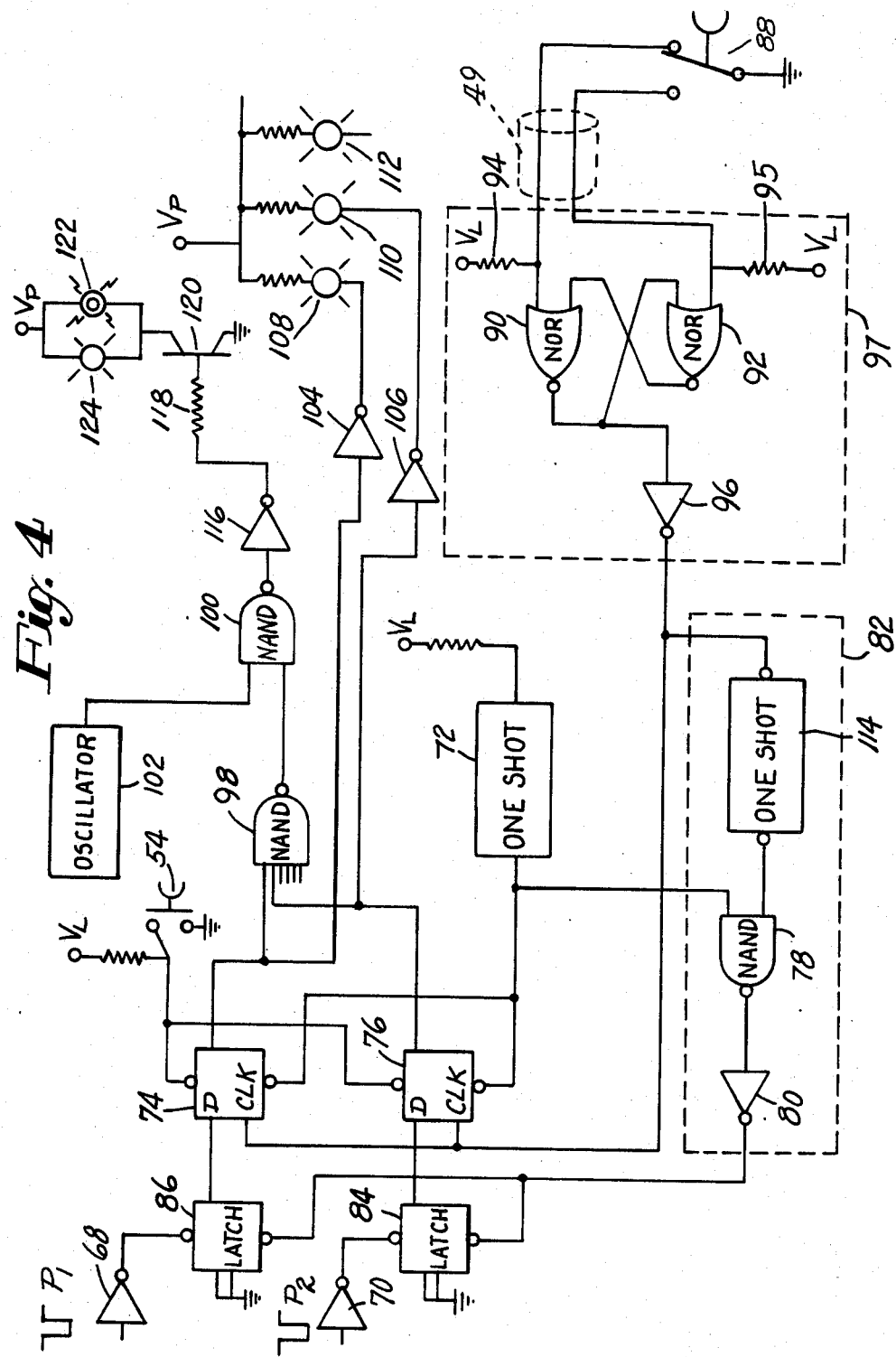
FIG. 4 illustrates the circuitry which processes the signals from the circuitry of FIG. 3 so as to appropriately alert the operator of the nailing machine when one or more nails are missing.

Referring now to FIG. 4, pulses $P_1$ and $P_2$ produced by amplifiers 68 and 70 are illustrated. It is to be understood that the pulse $P_2$ produced by the amplifier 70 is a result of a nail passing through the feed tube 16. In a similar manner, pulses (not shown) would be produced as a result of nails passing through the feed tubes 18 through 24 of FIG. 1. As will be explained in detail hereinafter, the pulses resulting from nails passing through respective feed tubes are processed in a particular manner by the circuitry of FIG. 4. The circuitry appropriately alerts the operator of the nailing machine when one or more pulses are not detected as a result of a particular pattern of nails having been fed through the feed tubes 14–24.

Figure 5:
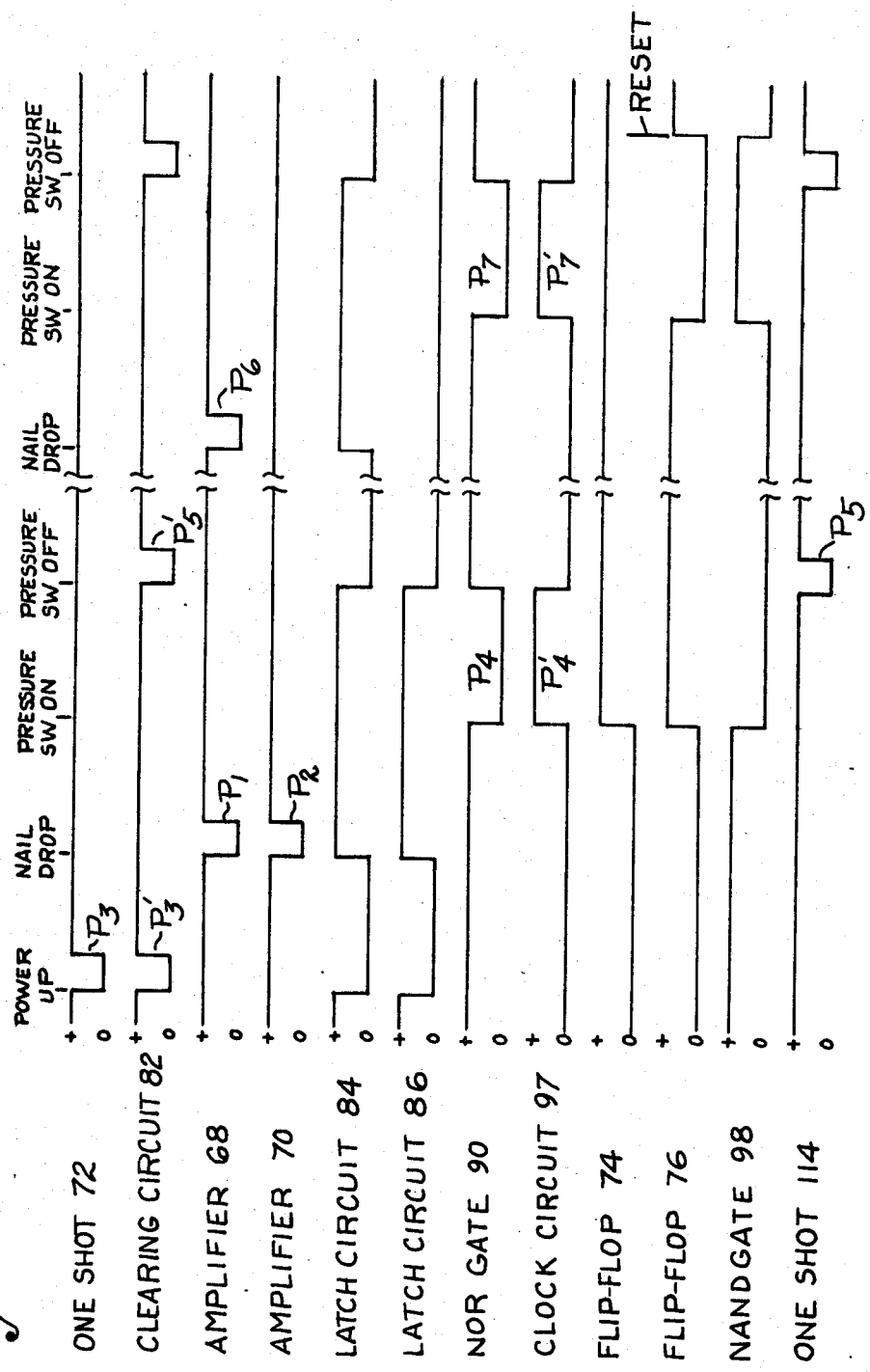
FIG. 5 illustrates various signals occurring within the circuitry of FIG. 4 under various conditions.

The circuitry of FIG. 4 will be discussed relative to a diagram of the signals occurring within the circuitry as is illustrated in FIG. 5. Referring to FIG. 5, various events are depicted relative to when they may occur within the normal operation of a nailing machine. In particular a "power up" event is seen to occur first. This will result in a logic level voltage $V_L$ being applied to the various terminals of the circuitry in FIG. 4. This voltage level is preferably plus five volts. This voltage is in particular applied to a one shot circuit 72 in FIG. 4 which produces a momentary pulse $P_3$ in FIG. 5. This pulse is applied to the clear inputs of a pair of D-type flip-flops 74 and 76 in FIG. 4. These flip-flops are set logically low as is indicated by their respective output signals in FIG. 5. The pulse $P_3$ from the one shot 72 is also gated through a NAND gate 78 and a buffer amplifier 80. The NAND gate 78 and buffer amplifier 80 form part of a pulse clearing circuit 82. The pulse $P_3$ passing through this circuitry produces a clearing pulse $P'_3$ at the output of the buffer amplifier 80 that is applied to the clear inputs of a pair of latch circuits 84 and 86. This clearing pulse appears in the output signal of the clearing circuit 82 illustrated in FIG. 5.

The circuitry of FIG. 4 is now ready to process electrical pulses such as $P_1$ and $P_2$ from the amplifiers 68 and 70. The pulses $P_1$ and $P_2$ are seen to occur in FIG. 5 when a "nail drop" has taken place. The pulses $P_1$ and $P_2$ are applied to the set inputs of the latch circuits 84 and 86 causing the latch circuits to be set low as is illustrated in FIG. 5.

It will be remembered from the discussion of FIG. 1 that the nail loader 28 is moved from the nail receiving position to the nailing station after the nail drop occurs. This is accomplished by a pneumatic actuator having a pressure switch associated therewith. The pressure switch is connected to the circuitry of FIG. 4 via the cable 49. Referring to FIG. 4, this pressure switch is labeled 88 and is illustrated in its normal state prior to any pneumatic pressure in the aforementioned pneumatic actuator. The terminals of the switch 88 define a set of input conditions to a pair of cross coupled NOR gates 90 and 92 via a pair of lines within the cable 49. In this regard, each active terminal of the switch is connected to a logic level voltage source $V_L$ having a respective resistance path 94 or 95. Depending on the switched condition of the switch 88, one of these NOR gates receives a logically high voltage level $V_L$ whereas the other receives a logically low grounded voltage condition. The state of the switch in FIG. 4 dictates that the NOR gate 90 receives a logically low input signal whereas the NOR gate 92 receives a logically high input signal. This will dictate a logically low output from the NOR gate 92 since any logically high input to a NOR gate will produce a logically low output. The logically low output of the NOR gate 92 will combine with the logically low input signal to the NOR gate 90 so as to produce a logically high signal. In this regard, the output of a NOR gate will only be logically high when all inputs thereto are logically low. Referring to FIG. 5, the logically high signal condition occurring at the output of the NOR gate 90 prior to the pressure switch 88 having been switched on is shown.

When pneumatic pressure occurs in the actuator which drives the nail loader 28, the pressure switch 88 assumes a differently switched state. In particular, the input to the NOR gate 92 becomes grounded whereas the input to the NOR gate 90 rises to the $V_L$ voltage level. This causes the NOR gate 90 to immediately switch low as is shown in FIG. 5 at the "pressure switch on" condition. It is to be noted that the output of the NOR gate will continue to stay at a logically low signal state until the pressure switch 88 is switched off. In this regard, any switch bounce in the pressure switch 88 as a result of activating the pneumatic actuator will not affect the output of the NOR gate 90. This continued logically low signal state during the "on state" of the pressure switch 88 defines a pulse $P_4$ in FIG. 5.

Referring to FIG. 4, the output of the NOR gate 90 is inverted by an amplifier 96 which defines the clock pulse output of what will hereinafter be referred to as the clock pulse circuitry 97. This clock pulse circuitry output will always be the inverted signal condition of the NOR gate 90 which in turn is dependent on the switched state of the pressure switch 88. In this regard, the pulse $P_4$ occurring in the output signal of the NOR gate 90 in FIG. 5 becomes the clock pulse $P'_4$ in the output signal from the clock pulse circuitry 97 illustrated in FIG. 5.

The positive clock pulse $P'_4$ is applied to the clock inputs of the flip-flops 74 and 76 in FIG. 4. The leading edge of this pulse will clock in the output signal state of the latch circuits 84 and 86 which are both logically high in FIG. 5. In this regard, both latch circuits will have been previously set logically high when the pulses $P_1$ and $P_2$ occurred. Both outputs of the flip-flops 74 and 76 will hence switch logically high as illustrated in FIG. 5.

Referring again to FIG. 4, the outputs of the flip-flops 74 and 76 are applied to a NAND gate 98. It is to be understood that the outputs of flip-flops (not shown) associated with nail sensing circuitry for sensing nails in the feed tubes 18–24 will also be similarly applied to the NAND gate 98. If all such inputs to the NAND gate 98 are logically high, indicating that a nail has been previously sensed in each feed tube, then the NAND gate 98 will be logically low. This is illustrated in FIG. 5 as having occurred when the two depicted output signals for the flip-flops 74 and 76 go logically high. Referring again to FIG. 4, the logically low signal condition at the output of the NAND gate 98 will disable a NAND gate 100 from gating an oscillating signal from an oscillator 102.

It is to be noted that the outputs of the D-type flip-flops 76 and 78, are also applied to buffer amplifiers 104 and 106. These amplifiers define an appropriate current path from a power voltage source $V_P$ through an appropriate resistance path to lights 108 and 110 on the display panel 50. In the event that an output of a buffer amplifier is low, current will flow through a respective resistance path and illuminate the associated display light. In this manner, a light will be illuminated when a nail has been previously detected as having passed through a respective nail tube so as to be present in the pattern of nails then in transit to the nailing station 36. It is to be noted that an additional light 112 is illustrated in FIG. 4. This is merely one of the four additional lights on the panel 50 that is to be associated with nail detecting circuitry for the feed tubes 18 through 24.

Referring again to FIG. 5, it is to be noted that the pressure switch 88 is switched off after the pneumatic actuator has moved the nail loader 28 to its final position over the nailing station 36. All lights on the display panel 50 will have been illuminated indicating that a full complement of nails in the nail loader 28 is being placed into the receiving holes of the nailing station. When the pneumatic pressure is switched off, the switch 88 will assume the position illustrated in FIG. 4 wherein the input terminal to the NOR gate 90 becomes grounded and the input to the NOR gate 92 rises to the logic level voltage $V_L$. This causes the NOR gate 90 to drop logically low so as to define the trailing edges of both the pulse $P_4$ and the clock pulse $P'_4$. The trailing edge of the pulse $P'_4$ triggers a one shot circuit 114 within the clearing pulse circuitry 82 of FIG. 4. The one shot circuit 114 produces a logically low pulse $P_5$ which is gated through the NAND gate 78 and reinverted by the buffer amplifier 80 so as to produce a clearing pulse $P'_5$ at the output of the clearing circuitry 82. This pulse clears the latch circuits 84 and 86 causing their outputs to drop logically low as is illustrated in FIG. 5.

Following the clearing of the latch circuits, the nail loader 28 will again be retracted to a position for receiving the next pattern of nails. It is to be understood that a period of time will now elapse before the next pattern of nails is dropped and the pneumatic actuator is again actuated. In particular, the shoe parts 42 and 44 must be positioned over the nailing station 36 and the nail drivers must be actuated so as to drive the previously transferred nails into the thus positioned shoe parts. This period of time is merely indicated by a break in the signals appearing in FIG. 5.

Referring to FIG. 5, the next nail drop produces a pulse $P_6$ at the output of the amplifier 68 indicating that a nail has been appropriately fed through the feed tube 14. A nail has not however been properly fed through the feed tube 16 as is indicated by the absence of a pulse from the amplifier 70. This means that at least one nail will be missing from the pattern of nails that is to be next transferred to the nailing station. This information will be retained for future use by the latch circuits 84 and 86. In this regard, the latch circuit 84 will be set high as a result of receiving the pulse $P_6$ while the latch circuit 86 will remain logically low. It will be remembered that the status of the latch circuits is clocked into the flip-flops 74 and 76 at such time as the pressure switch 88 is switched on so as to generate a pulse $P_7$ at the output of the NOR gate 90 which in turn produces the clock pulse P'7. The flip-flop 74 will remain logically high whereas the flip-flop 76 will switch logically low indicating the absence of a nail at the designated position in the pattern of nails being transferred. The logically low condition of the flip-flop 76 will cause the NAND gate 98 to switch logically high. This will enable the NAND gate 100 to gate an oscillating signal from the oscillator 102. The oscillating signal is amplified by a buffer amplifier 116 so as to produce a current through a resistor 118 that switches a transistor 120 on and off. This excites a buzzer 122 as well as a flashing light 124. The noise of the buzzer 122 in conjunction with the flashing light 124 will alert the operator that one or more nails are missing. The missing nails will be indicated by lights on the display panel 50 that are not illuminated. In this regard, light 110 will not be illuminated by virtue of the buffer amplifier 106 receiving a logically low signal from the flip-flop 76. It is to be understood that the operator will quickly be able to identify where a nail is missing in the nailing station since the pattern of lights on the display panel is oriented in the same manner as the pattern of holes in the nailing station.

The operator now places nails into the respective receiving holes that are indicated as having not received a nail from the nail loader 28. The operator thereafter presses the reset button 54 on the display panel 50. Depression of the button 54 will ground all reset terminals of the flip-flops such as 74 and 76. This will reset the flip-flop circuit 76 logically high as is indicated in FIG. 5. This produces a logically low signal at the output of the NAND gate 98 which in turn disables the NAND gate 100 so as to turn off the flashing light 124 and buzzer 122. All lights on the display panel 50 will now be illuminated. The shoe parts 42 and 44 can now be placed into position with the assurance that a complete pattern of nails will be driven into the thus positioned parts.

It is to be appreciated that a preferred embodiment of a system for detecting the presence or absence of nails in a nail pattern has been disclosed herein. It is to be understood that this preferred embodiment might be changed without departing from the scope of the invention. For example, pressure switch 88 could be replaced by a limit switch which would detect relative movement between the bottom and top members of the nail loader at such time as the nails were being transferred to the nailing station 36. This event could be used to trigger the remaining circuitry of the system so as to thereby alert the operator of missing nails in the thus transferred pattern.

What is claimed is:

1. A system for detecting the transfer of nails from a first station within a nailing machine to a second station within the machine wherein the nails are arranged in a nailing pattern at the second station, said system comprising:
    means for sensing the passage of nails from the first station to the second station wherein the nails are arranged in the nailing pattern;
    means, responsive to the sensing of the passage of nails, for accounting for each nail that is to be present in the nailing pattern; and
    means, responsive to said accounting means, for alerting the operator of the nailing machine at a predetermined time prior to a nailing operation of the nailing machine when at least one nail is missing from the nailing pattern.

2. The system of claim 1 further comprising:
    means for indicating to the operator which location within the nailing pattern is missing a nail.

3. The system of claim 1 wherein said means for sensing the passage of nails from the first station to the second station wherein the nails are arranged in the nailing pattern comprises:
    a plurality of individual feed tubes which define individual paths for the nails traveling to given locations within the nailing pattern at the second station; and
    means, associated with each individual feed tube, for sensing when a nail has passed through the tube to a given location within the nailing pattern.

4. The system of claim 3 wherein said means, associated with each individual feed tube, for sensing when a nail has passed through the tube comprises:
    means for optically sensing a nail passing through each tube; and
    means, responsive to said optical sensing means, for generating an electrical pulse signal indicative of the nail passing through the respective tube.

5. The system of claim 4 wherein said means for accounting for each nail that is to be present in the nailing pattern comprises:
    means, responsive to each electrical pulse signal, for generating a further electrical signal of longer duration than the electrical pulse signal, said further electrical signal indicating that a nail has passed through the respective tube.

6. The system of claim 5 wherein said means for alerting the operator of the machine when at least one nail is missing from the nailing pattern comprises:
    means for checking each further electrical signal, indicating whether a nail has passed through a respective tube, at the predetermined time prior to a nailing operation of the nailing machine.

7. In a nailing machine wherein nails are fed through a plurality of feed tubes to locations within a predefined nailing pattern, a system for alerting the operator of the machine when one or more nails have not been properly fed to the locations within the predefined nailing pattern, said system comprising:
    means, associated with each feed tube, for sensing the passage of a nail in the respective feed tube; and
    means for alerting the operator of the machine at a predetermined time during the operation of the machine when the passage of a nail has not been previously sensed in any of the feed tubes.

8. The system of claim 7 wherein said means for sensing the passage of a nail in the respective feed tube comprises:
    a plurality of means for optically sensing the passages of nails, each optically sensing means being associated with a respective feed tube; and
    a plurality of means, each responsive to a separate optical sensing means, for generating an electrical signal indicative of the passage of a nail in a respective feed tube, said electrical signal exfending in duration so as to allow said alerting means to be operative at the predetermined time during the operation of the machine.

9. The system of claim 8 wherein said means for alerting the operator of the machine comprises:
    means for exciting an alarm at the predetermined time during the operation of the nailing machine when one or more electrical signals generated by said plurality of means responsive to the optical sensing means do not indicate that the passage of a nail has previously occurred in one or more tubes.

10. The system of claim 7 or claim 9 further comprising:
means for displaying the status of whether a nail has been received at each location within the nailing pattern.

11. The system of claim 7 wherein said means for alerting the operator of the machine comprises:
means, associated with said sensing means, for indicating whether the passage of a nail has previously been sensed in each feed tube; and
means for exciting an alarm at the predetermined time during the operation of the machine when said indicating means indicates that the passage of a nail has not been sensed in at least one feed tube.

12. A system for detecting the transfer of nails from a first station within a nailing machine to a second station within the machine wherein the nails are arranged in a nailing pattern at the second station, said system comprising:
a plurality of individual feed tubes which define individual paths for the nails traveling to given locations within the nailing pattern at the second station;
a plurality of means, each associated with individual feed tubes, for indicating whether the passage of a single nail has previously occurred in a respective feed tube; and
means for checking each of said plurality of indicating means at a predetermined time during the operation of the nailing machine so as to detect any feed tube wherein the passage of a nail has not previously occurred.

13. The system of claim 12 further comprising:
means, responsive to said checking means detecting a feed tube wherein the passage of a nail has not previously occurred, for alerting the operator of the machine as to a missing nail condition within the machine.

14. The system of claim 13 wherein each of said means for indicating whether the passage of a single nail has previously occurred in a respective feed tube comprises:
means for generating an electrical pulse when a nail passes through an individual feed tube; and
means, responsive to said electrical pulse for producing a continuous indication of the passage of a single nail through the respective feed tube after the pulse has terminated.

15. The system of claim 13 further comprising:
means for generating a timing signal to said checking means at the predetermined time in response to a particular cyclical function occurring within the normal cyclical operation of the machine, whereby said checking means is operative to detect a missing nail condition at the predetermined time.

16. The system of claim 15 wherein said checking means comprises:
a plurality of buffer storage means, responsive to the timing signal, for storing the indications from said plurality of indicating means, and
means for gating the outputs of said buffer storage means so as to determine if any stored indication does not indicate a previous passage of a nail in a respective feed tube.

17. The system of claim 15 or 16 wherein the particular cyclical function occurring within the normal cyclical operation of the nailing machine comprises the transfer of the nails arranged in the nailing pattern from said second station to a nailing station whereby said checking means is operative to detect the absence of a nail from the transferred pattern of nails to said nailing station.

* * * * *